April 4, 1967 R. J. BOEDIGHEIMER 3,312,420
TORSION PRE-LOAD MEANS
Original Filed Jan. 2, 1964
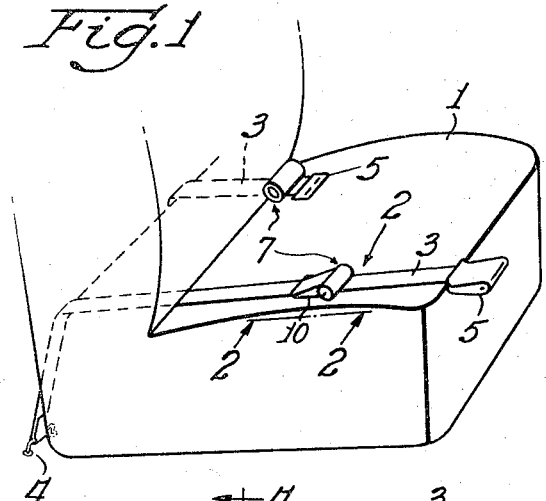
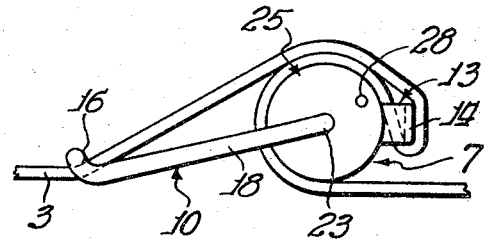
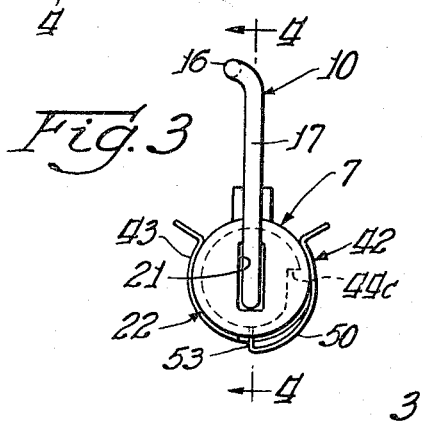
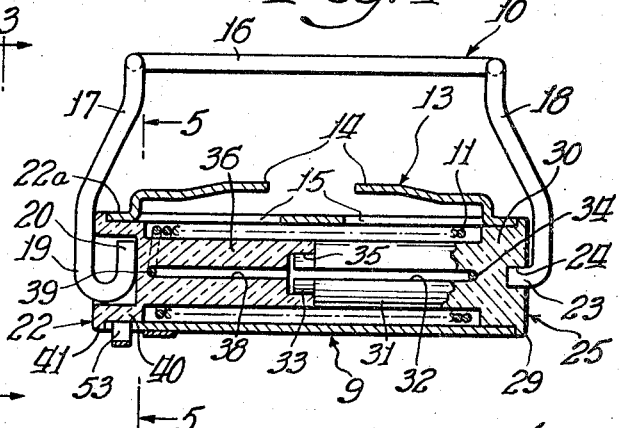
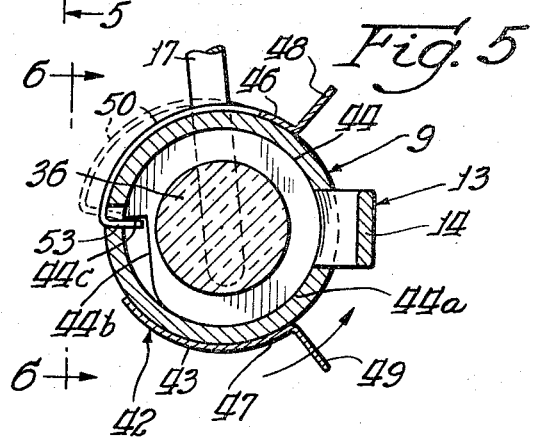
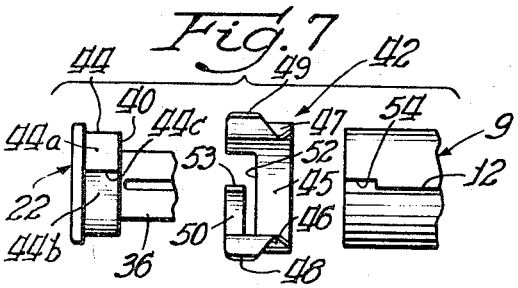
Inventor:
Raymond J. Boedigheimer
By: Richard J. Myers Atty.

United States Patent Office 3,312,420
Patented Apr. 4, 1967

3,312,420
TORSION PRE-LOAD MEANS
Raymond J. Boedigheimer, Chicago, Ill., assignor to Borg-Warner Corporation, Chicago, Ill., a corporation of Illinois
Continuation of abandoned application Ser. No. 335,026, Jan. 2, 1964. This application Nov. 26, 1965, Ser. No. 514,754
9 Claims. (Cl. 242—107.11)

This is a continuation of application Ser. No. 335,026, filed Jan. 2, 1964, and now abandoned.

This invention relates to torsion pre-load means for a safety seat belt retractor device and in particular to a torsion pre-load means for the spring winding mechanism of a seat belt retractor device that allows vehicle seat belt lengths to be rolled up by a retractor or roll-up type device into spiral coils that are thereby kept in a compact condition in order to prevent their being soiled or otherwise being caught in undesirable areas of the vehicle where they could be damaged.

It is therefore a general object of this invention to provide a torsion pre-load means for a retractor or belt roll-up device for vehicle safety belts.

Another object of this invention is to provide a spring pre-winding means for the coil spring of a belt retractor device used to roll up the vehicle safety seat belt into a compact unit which would otherwise be soiled or damaged by coming in contact with objects or other portions of the vehicle.

Another object of this invention is to provide a torsion pre-loading device that limits the movement of the relatively rotational components of a safety seat belt retractor device to permit easy and safe installation of the retractor device on the vehicle safety belt.

Still another object of this invention is to provide a spring pre-wind mechanism for a seat belt retractor which measures the degree of pre-loading and which counts each revolution of the reaction member of the retractor device relative to the spring container by issuing an audible click for each revolution.

A still further object of this invention is to provide a pre-wind clip means fastenable to the safety seat belt retractor device for allowing 360 degree turn of pre-loading of the retractor spring but preventing any unloading or unwinding of the retractor spring.

Another object of this invention is to provide a pre-wind clip means for a safety seat belt retractor device that may readily be attached to the retractor device or readily removed therefrom for disposal or for other purposes.

The foregoing and other objects and advantages of the present invention becomes apparent in the following detailed description thereof when read in conjunction with the accompanying drawings:

FIG. 1 is perspective view of a seat equipped with safety seat belts having a retractor or roll up device attached thereto;

FIG. 2 is a view taken along line 2—2 of FIG. 1;

FIG. 3 is a longitudinal view of the pre-wind retainer means on the belt retractor mechanism taken along line 3—3 of FIG. 4;

FIG. 4 is a sectional view taken along line 4—4 of FIG. 3;

FIG. 5 is a view taken along line 5—5 of FIG. 4;

FIG. 6 is a view taken along line 6—6 of FIG. 5; and

FIG. 7 is an exploded view of the invention.

With reference now to the figures there is shown a vehicle seat 1 upon which rests a safety seat belt structure 2 having seat belt lengths 3, 3 each attached to a vehicle anchor end 4 and each at the forward end having a coupling member 5. A safety seat belt take-up means in the form of a retractor or roll-up device 7 is fastened to each seat belt length 3 and comprises an energy storing means which may take the form of a barrel-shaped or tubular member 9, a reaction means in the form of a generally U-shaped bail or arm or lever means 10 relatively rotatively journalled with respect to the member 9, and a spring means in the form of a helical coil spring 11 in the member 9. Each belt length 3 is disposed about the barrel in double spiral belt layers or coils as seen in FIGS. 1 and 2.

The tubular member 9 has an elongated slot 12 extending longitudinally thereacross and a clamp means 13 opposite the side of the barrel slot 12. The clamp means 13 include a pair of generally L-shaped arms 14, 14 as viewed in FIG. 4, attached through the barrel above slots 15, 15 formed from punching out the arms from the tube 9. The reaction member 10 includes a transverse or axially extending arm 16 and a pair of radial arms 17, 18. Radial arm 17 has a U-shaped free end portion 19 having an extension 20 received in an opening or recess 21 of the driver plug 22 received into one end 22a of the barrel 9 and the other radial arm 18 has an end part 23 extending into the aperture or recess 24 in the anchor plug 25. The anchor plug 25 is constrained for rotation relative to the tubular member 9 by being locked to the latter. The anchor plug 25 on its outside periphery is provided with an aperture or recess 28 and it has its disc portion 29 against the barrel edge retaining it against inward axial movement and intermediate guide portion 30 and a shaft portion 31 extending inwardly into the barrel 9 and having an elongated axially extending slot 32. The inner end of the anchor shaft portion 31 has a reduced tip portion 33 and the convolutions of the helical spring 11 extend about the shaft portion 31 with a spring end extension 34 extending into the shaft 32 and slidable therealong. The inner tip portion 33 of the shaft portion 31 is received into the counter bore 35 of the spring hub drive shaft portion 36 which has an elongated axial slot 38 for receiving the other tip end 39 of the spring 11 which is slidable therein and along. The spring driver member 22 has an enlarged guide portion 40 connecting with the shaft portion 36 and a disc or flange 41 which engages the side of the tubular member 9 to limit inward axial movement thereof.

The torsion pre-load means comprises a pre-wind retainer clip 42 and cam means in the form of a cam and ratchet tooth part 44 of the spring driver hub portion 40 of the member 22 as referred to FIGS. 3 through 7. The cam means of the driver hub portion 40 has a cam periphery or surface 44 having an outer arcuate or circular peripheral surface section 44a joining a flat surface section 44b that connects with flat surface section 44b perpendicular to surface section 44c. The surface sections 44b and 44c define a ratchet tooth zone with the surface section 44a and the surface section 44b. The surface section 44b merges to section 44a to define a cam zone. The pre-wind clip which may be removed from or placed on the retractor device 7 comprises a resilient strip of material which may be made from spring steel. This strip is arcuate in shape and is defined by interconnected curved finger portions 46 and 47 which are clasped about the outer periphery of the tubular member 9. Each of the finger portions 46 and 47 have tabs or transversely extending flanges 48 and 49 respectively at their free ends for snapping in and removing the clip from the retractor mechanism 7. A curved spring lead or arm 50 extends from the finger portion 46 and defines with the finger portions 46, 47 and the interconnecting portion 45 an L-shaped groove 52, the spring leaf 50 at its free end having a projection 53 extending radially inward through an enlarged slot 54 at the end of the tubular member 9 and connecting with the slot 12, the projection 53 further extending radially inward and engaging with the flat surface section 44c as seen in FIG. 5.

Operation

The retractor mechanism 7 is placed in a prewound condition prior to its installation on the vehicle seat belt length. This is accomplished by rotating the tubular member 9 while holding the reaction member 10 fixed. The direction of rotation may be indicated on the exterior of the barrel as shown in FIG. 6. The winding of the spring 11 may be mechanical, as the number of revolutions increase the barrel becomes harder to wind and hold relative to the reaction member 10 and if set free could hurt the hands of the user.

In order to avoid such and similar difficulties the pre-wind clip 42 being of flexible spring-like material, is placed around and slipped on the barrel 9 with the projection 53 entering the slot 54 in the barrel 9 and registering with the flat cam surface 44c i.e. to permit the outside vertical surface of the projection to engage with the vertical surface of the ratchet tooth portion. Then by rotating the barrel in the direction of the arrow with the reaction member fixed, the projection 53 is allowed to have its lower tip end slide along the cam surface 44b until the outer peripheral surface 44a of the cam 44 is reached whence the projection 53 rises and rides on the outer periphery 44a for approximately one revolution of the barrel 9 and then rides over the tooth edge (see dotted line position, FIG. 5) and on to the cam surface 44b making an audible click. The procedure is repeated until sufficient number of revolutions are made to place the retractor device in the desired pre-wound or loaded condition. By counting the number of audible clicks or revolutions one may determine the extent of spring loading which is directly related to the length of a seat belt portion to be rolled. The projection 53 engaging with the radial stop surface 44c prevents movement of the barrel 9 relative to the reaction member 10 in the opposite direction of winding (i.e. in a direction opposite to the direction the arrow is pointing). The retractor mechanism 7 is then fastened to the belt by the clamp means 13 and the pre-wind clip 42 is then removed and the belt sections 3, 3 are allowed to wind about the retractor mechanism 7 in a double-ply spiral coils. The pre-wind clip 42 may be then discarded or used at a later time should it be desired to put the retractor device 42 on another seat belt. It will be noted that the hole 28 in the side of the anchor member may have a pin or other element inserted into it to hold the retractor mechanism in a pre-loaded condition by having the edge of the pin engage the retractor arm 18. This facilitates removal of the clip 42 prior to placing the mechanism 7 on the safety seat belt.

Once the safety belt length is wrapped about the barrel of the retractor device it is stored out of the way from being soiled or damaged.

It will be appreciated that other variations and modifications of this invention may be made without departing from the spirit and scope of the appended claims wherein it is claimed:

1. In a retractor mechanism for rolling up a section of flat belt including a reel adapted for connection to a bight portion of said belt, a reaction member mounted for rotation with respect to said reel having a portion thereof spaced from the axis of said reel adapted to bear on said belt, and a torsion spring having one end thereof anchored to said reel and having the other end thereof adapted for connection to said reaction member, the improvement comprising: drive means connected between said reaction member and said other end of said spring, said drive means being provided with a cam surface and a stop surface; and clamp means disposed about said reel and fastened against relative rotation with respect thereto, said clamp means including a stop element having sliding engagement with said cam surface permitting winding of said spring in one direction, said stop element being engageable with said stop surface in the other direction preventing unwinding of said spring.

2. The structure according to claim 1 in which said clamp means is a resilient clip having end portions thereof disposed about said reel and in which said stop element is a radial projection extending inwardly from said clip.

3. The structure according to claim 2 in which said cam surface is disposed radially inwardly of said projection and in which said stop surface is circumferentially disposed with respect to said projection in movement obstructing relation thereto.

4. The structure according ot claim 2 in which said projection comprises a resilient arm cooperating with said cam surface and stop surface to produce an audible click as said drive means is rotated with respect to said reel.

5. The structure according to claim 1 in which said drive means is recessed within said reel, said reel including a slot registrable with said cam surface and stop surface, said stop element extending through said slot into engagement with said cam surface, said stop element and stop surface co-acting with said reel to prevent rotation of said reaction member relative to said reel in one direction while maintaining said spring in a wound state.

6. The structure according to claim 5 in which said clamp means is an arcuate shaped resilient clip having end portions thereof disposed in gripping relation with said reel, and in which said stop element is connected to said end portions having a portion thereof extending radially inwardly through said slot into engagement with said cam surface.

7. The structure according to claim 6 in which said stop surface is radially disposed and in which said cam surface has a gradually increasing radius, said stop element being adapted for radially inward and outward movement with respect to said drive means permitting relative rotation between said drive means and reel in one direction for winding said spring.

8. The structure according to claim 6 in which said clip includes a pair of oppositely extending resilient fingers for gripping said reel having a flexible projection extending radially inwardly between said fingers forming said stop element.

9. The structure according to claim 8 in which said clip comprises a pair of interconnected arcuate finger portions of expandable resilient spring-like material, defining an aperture between the distal ends thereof each of said finger portions including a manual clasp tab proximate the distal end thereof for placing and removing said clip on and from said reel.

References Cited by the Examiner

UNITED STATES PATENTS

| 422,591 | 3/1890 | Hayden et al. | 242—107.11 |
|---|---|---|---|
| 1,070,684 | 8/1913 | Harter | 242—107.22 |

References Cited by the Applicant

UNITED STATES PATENTS

| 1,313,644 | 8/1919 | Simon. |
| 2,037,324 | 4/1936 | Heusinkveld et al. |
| 2,201,610 | 5/1940 | Dawson. |
| 2,684,070 | 7/1954 | Kelsey. |
| 2,767,426 | 10/1956 | Grupp. |
| 2,830,655 | 4/1958 | Lalande. |
| 2,843,335 | 7/1958 | Hoven et al. |
| 2,945,275 | 7/1960 | Almeter. |
| 3,068,980 | 12/1962 | Smirl. |

FRANK J. COHEN, *Primary Examiner.*